United States Patent
Moon et al.

(10) Patent No.: US 7,999,784 B2
(45) Date of Patent: Aug. 16, 2011

(54) BACKLIGHT UNIT OF LIQUID CRYSTAL DISPLAY DEVICE AND METHOD FOR DRIVING THE SAME

(75) Inventors: Jeong Min Moon, Kyonggi-do (KR); Jun Young Bang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 23 days.

(21) Appl. No.: 10/995,897

(22) Filed: Nov. 24, 2004

(65) Prior Publication Data

US 2005/0111237 A1 May 26, 2005

(30) Foreign Application Priority Data

Nov. 26, 2003 (KR) .................. 10-2003-0084545

(51) Int. Cl.
*G09G 3/36* (2006.01)

(52) U.S. Cl. ............ 345/102; 315/209 R; 315/312; 315/362

(58) Field of Classification Search .......... 362/561, 362/614, 630–634, 29, 74; 315/294, 408, 315/74, 128, 209 R, 210, 224, 226, 312, 362; 345/102
See application file for complete search history.

(56) References Cited

U.S. PATENT DOCUMENTS

| | | | | |
|---|---|---|---|---|
| 3,078,389 A * | 2/1963 | Corry | ............... | 315/185 R |
| 4,570,035 A * | 2/1986 | Pinede et al. | ............... | 379/164 |
| 4,675,578 A * | 6/1987 | Mitchell et al. | ............... | 315/315 |
| 5,519,289 A * | 5/1996 | Katyl et al. | ............... | 315/224 |
| 6,023,131 A * | 2/2000 | Okita | ............... | 315/291 |
| 6,310,444 B1 * | 10/2001 | Chang | ............... | 315/282 |
| 6,919,693 B2 * | 7/2005 | Fushimi | ............... | 315/219 |
| 6,936,975 B2 * | 8/2005 | Lin et al. | ............... | 315/224 |
| 6,956,555 B2 * | 10/2005 | Kyomoto | ............... | 345/102 |
| 7,026,916 B2 * | 4/2006 | Alexander | ............... | 340/286.09 |
| 7,742,031 B2 * | 6/2010 | Numao | ............... | 345/102 |
| 2001/0048595 A1 * | 12/2001 | Richardson | ............... | 362/92 |
| 2002/0021564 A1 * | 2/2002 | Cho et al. | ............... | 362/97 |
| 2002/0105291 A1 * | 8/2002 | Moo et al. | ............... | 315/312 |
| 2002/0130628 A1 * | 9/2002 | Shin | ............... | 315/312 |
| 2003/0155873 A1 * | 8/2003 | O'Meara | ............... | 315/312 |
| 2003/0178951 A1 * | 9/2003 | Park et al. | ............... | 315/312 |
| 2003/0202363 A1 * | 10/2003 | Adachi et al. | ............... | 362/558 |
| 2004/0066306 A1 * | 4/2004 | Pederson | ............... | 340/815.45 |
| 2004/0232853 A1 * | 11/2004 | Hur et al. | ............... | 315/291 |
| 2004/0245944 A1 * | 12/2004 | Lee et al. | ............... | 315/294 |

FOREIGN PATENT DOCUMENTS

| | | |
|---|---|---|
| JP | 09-050785 | 2/1997 |
| JP | 2002-303848 | 10/2002 |
| KR | 10-2001-0007304 | 1/2001 |
| KR | 10-2003-0049200 | 6/2003 |

* cited by examiner

*Primary Examiner* — Evan Dzierzynski

(74) *Attorney, Agent, or Firm* — McKenna Long & Aldridge, LLP.

(57) ABSTRACT

A backlight unit includes a plurality of fluorescent lamps divided into a plurality of groups of fluorescent lamps arranged in parallel, each group including at least two fluorescent lamps, and a plurality of inverters electrically connected with the plurality of fluorescent lamps by respectively corresponding to the plurality of groups of fluorescent lamps.

6 Claims, 5 Drawing Sheets

BACKLIGHT UNIT OF LIQUID CRYSTAL DISPLAY DEVICE AND METHOD FOR DRIVING THE SAME

The present invention claims the benefit of Korean Application No. P2003-084545, filed on Nov. 26, 2003, which is hereby incorporated by reference.

BACKGROUND OF THE INVENTION

1. Field of the Invention

The present invention relates to a liquid crystal display (LCD) device, and more particularly, to a backlight unit for an LCD and a method for driving the same. Although the present invention is suitable for a wide scope of applications, it is particularly suitable for increasing the life-span of a lamp of the backlight unit and reducing fabrication costs.

2. Discussion of the Related Art

Generally, a cathode ray tube (CRT) device, which is one type of flat display devices, has been widely used as monitors for a television, a measuring apparatus, and an information terminal. However, the CRT device does not have characteristics of compact size and lightweight. Thus, the display devices such as an LCD device using an electric field optical effect, a plasma display panel (PDP) using a gas discharge, and an electroluminescence display (ELD) device using an electric field luminous effect have been developed to substitute the CRT device. Among these display devices, since the LCD device is power-efficient, slim and lightweight, the LCD device has been most extensively researched and developed as monitors for desktop computers (or personal computers) and large sized display devices, as well as laptop computers (or notebook computers). Accordingly, the LCD devices have recently been in great demand.

Most LCD devices control the light transmittance from ambient light to display an image. In this respect, it is necessary to form an additional light source, such as a backlight unit, in an LCD panel. The backlight unit severs as a light source of the LCD device and is usually classified into a direct type and an edge type depending upon the location of a fluorescent lamp.

In the edge type backlight unit, a lamp unit is provided at a lateral side of a light-guiding plate. The lamp unit includes a fluorescent lamp, a lamp holder inserted to both ends of the fluorescent lamp to hold the fluorescent lamp, and a reflective sheet reflecting light emitted from the fluorescent lamp to the light-guiding plate. The edge type backlight unit is generally installed in small sized LCD devices such as monitors of laptop computers and desktop computers, since the edge type backlight is advantageous in a light uniformity, a long life-span, and a thin profile of the LCD device.

With increasing demands for large-sized LCD devices of 20-inch or more, the direct type backlight unit is actively developed, in which a plurality of lamps are arranged in one line on a lower surface of a light-diffusion sheet, so that the entire surface of the LCD panel is directly illuminated with light from the lamps. The direct type backlight unit has greater light efficiency than that of the edge-type backlight unit, and is suitable for the large-sized LCD device that requires high luminance. That is, the LCD device of the direct type backlight unit is generally installed in the large-sized monitor or the television. The large-sized monitor or the television is usually driven for a long time, and has a plurality of lamps, whereby it tends to have the lamps being turned off. In the direct type LCD device, a plurality of lamps are installed underneath the screen. Accordingly, if one of the lamps is turned off due to troubles of the lamp or the end of the lamp life, a screen portion corresponding to the turned-off lamp portion becomes darker as compared with surrounding portions of the screen. In this respect, it is necessary for the direct type LCD device to have a simple structure suitable for readily disassemble and assemble of the lamp unit.

Hereinafter, a related art backlight unit will be described with reference to the accompanying drawings. FIG. 1 is a perspective view of a related art direct type backlight unit for an LCD device. FIG. 2 is a schematic view of a fluorescent lamp and a connector of the related art direct type backlight unit in FIG. 1. FIG. 3 is a concept view schematically explaining a scanning driving method according to the related art.

As shown in FIG. 1, the related art backlight unit includes a plurality of fluorescent lamps 1, an outer case 3 for accommodating the plurality of fluorescent lamps 1, and light-scattering means 5a, 5b and 5c. The plurality of fluorescent lamps 1 are arranged at fixed intervals along one direction and fixed in the outer case 3. Then, the light-scattering means 5a, 5b and 5c are provided between the fluorescent lamps 1 and an LCD panel (not shown) to prevent a silhouette of the fluorescent lamps 1 from being reflected on a display surface of the LCD panel and to realize uniform luminance. To improve the light-scattering effect, a plurality of diffusion sheets and one diffusion plate are arranged between the fluorescent lamps 1 and the LCD panel. Also, a reflective sheet 7 is arranged inside the outer case 3 for concentrating the light emitted from the fluorescent lamps 1 to the display part of the LCD panel, thereby improving light efficiency.

Referring to FIG. 2, the fluorescent lamp 1 is a cold cathode fluorescent lamp (CCFL). Inside the fluorescent lamp 1, there are two electrodes 2 and 2a respectively mounted at two ends of the fluorescent lamp 1. As shown in FIG. 1, the both ends of the fluorescent lamp 1 are inserted into both sides of the outer case 3. Also, power supplying wires 9 and 9a are connected with the electrodes 2 and 2a of the fluorescent lamp 1 so as to provide the power for driving the fluorescent lamp 1. The power supplying wires 9 and 9a are also connected with a driving circuit by an additional connector 11. Thus, each fluorescent lamp 1 requires the additional connector 11. That is, the power supplying wire 9 connected to the electrode 2 and the power supplying wire 9a connected to the electrode 2a are both connected to the connector 11. Moreover, any one of the power supplying wires 9 and 9a is curved to the lower side of the outer case 3 for being connected with the connector 11.

However, in the related art backlight unit, the connector is connected with the power supplying wires of the fluorescent lamp, to be in contact with the driving circuit. Thus, each fluorescent lamp requires an individual connector. For this reason, the structure of the wires is complicated, and operation efficiency is lowered, because the power supplying wires are curved for being connected with the connector to decrease a thickness of the backlight unit. Also, it requires the additional process, thereby increasing a fabrication time and lowering a yield. In addition, a hole passing through the outer case is formed to connect the electrode with the connector, and the both electrodes of the fluorescent lamp are inserted to the hole to be exposed to the outside of the outer case. As a result, the operation efficiency is lowered, and maintenance and repair of the fluorescent lamp become difficult.

Further, unlike the CRT that is driven in a pulse type, the LCD device is driven in a hold type, so that the LCD device may have a problem of a motion blur generated due to over-lapped images between frames on displaying a moving picture. In order to overcome this problem, as shown in FIG. 3, a backlight unit driven in a scanning method using CCFLs 30 is developed, which is an applied pulse type driving method of the CRT by sequentially turning on/off the plurality of CCFLs 30 by a video signal, thereby enhancing the characteristics of the moving picture.

However, as described above, when the backlight unit employs the CCFLs 30, each of the CCFLs 30 requires an individual inverter (31a, 31b, 31c, ... , or 31n), thereby increasing fabrication costs. Also, since the CCFLs 30 are repetitively turned on/off, hydrargyrum (Hg) is exhausted due to a sputtering phenomenon caused in the internal electrode, thereby shortening the life-span of the CCFLs 30.

SUMMARY OF THE INVENTION

Accordingly, the present invention is directed to a backlight unit and a method for driving the same that substantially obviates one or more problems due to limitations and disadvantages of the related art.

An object of the present invention is to provide a backlight unit, which is capable of increasing the life-span of a lamp and reducing fabrication costs by decreasing the number of inverters.

Another object of the present invention is to provide a method for driving the backlight, which is capable of increasing the life-span of a lamp and reducing fabrication costs by decreasing the number of inverters.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described, the backlight unit includes a plurality of fluorescent lamps divided into a plurality of groups of fluorescent lamps arranged in parallel, each group including at least two fluorescent lamps; and a plurality of inverters electrically connected with the plurality of fluorescent lamps by respectively corresponding to the plurality of groups of fluorescent lamps.

In another aspect, the backlight unit includes a plurality of fluorescent lamps connected in parallel along one direction; an inverter to apply a driving voltage to the plurality of fluorescent lamps; and a switching part provided between the plurality of fluorescent lamps and the inverter to switch the driving voltage applied to the plurality of fluorescent lamps from the inverter.

In another aspect, the method for driving a backlight unit includes dividing a plurality of fluorescent lamps provided along one direction into a plurality of groups of fluorescent lamps, each group including at least one fluorescent lamp; and sequentially driving the plurality of fluorescent lamps by group.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a backlight unit of an LCD device and a method for driving the same according to the present invention will be described with reference to the accompanying drawings.

Figure 1:
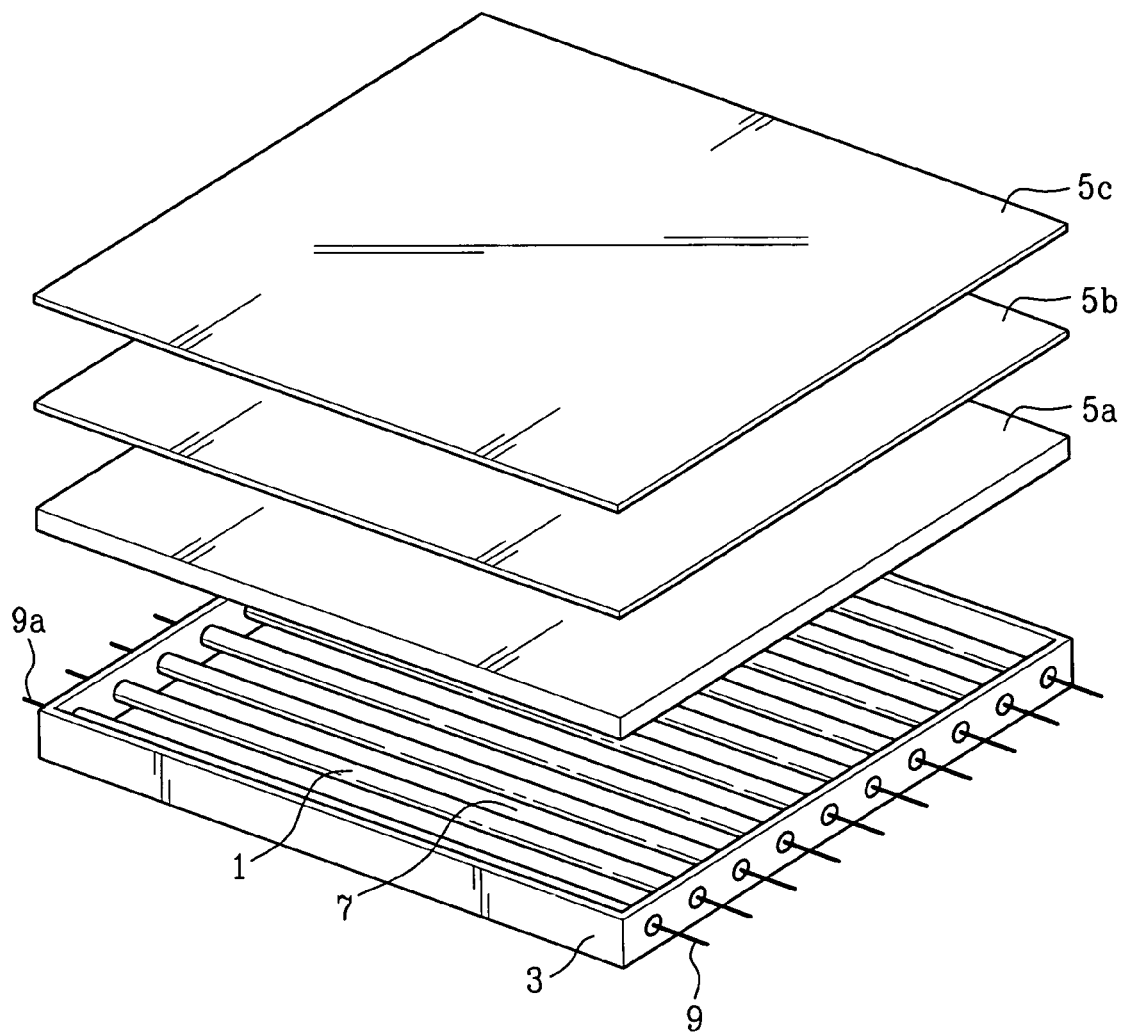
FIG. 1 is an expended perspective view of a direct type backlight unit for an LCD device according to the related art.
Figure 2:
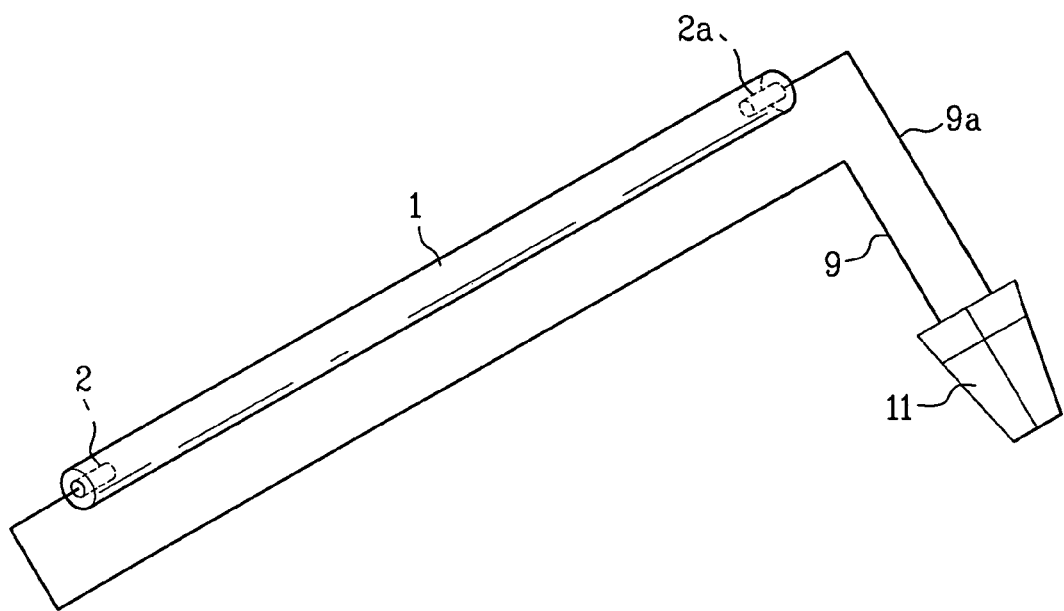
FIG. 2 is a schematic view of a fluorescent lamp and a connector of the related art direct type backlight unit in FIG. 1.
Figure 3:
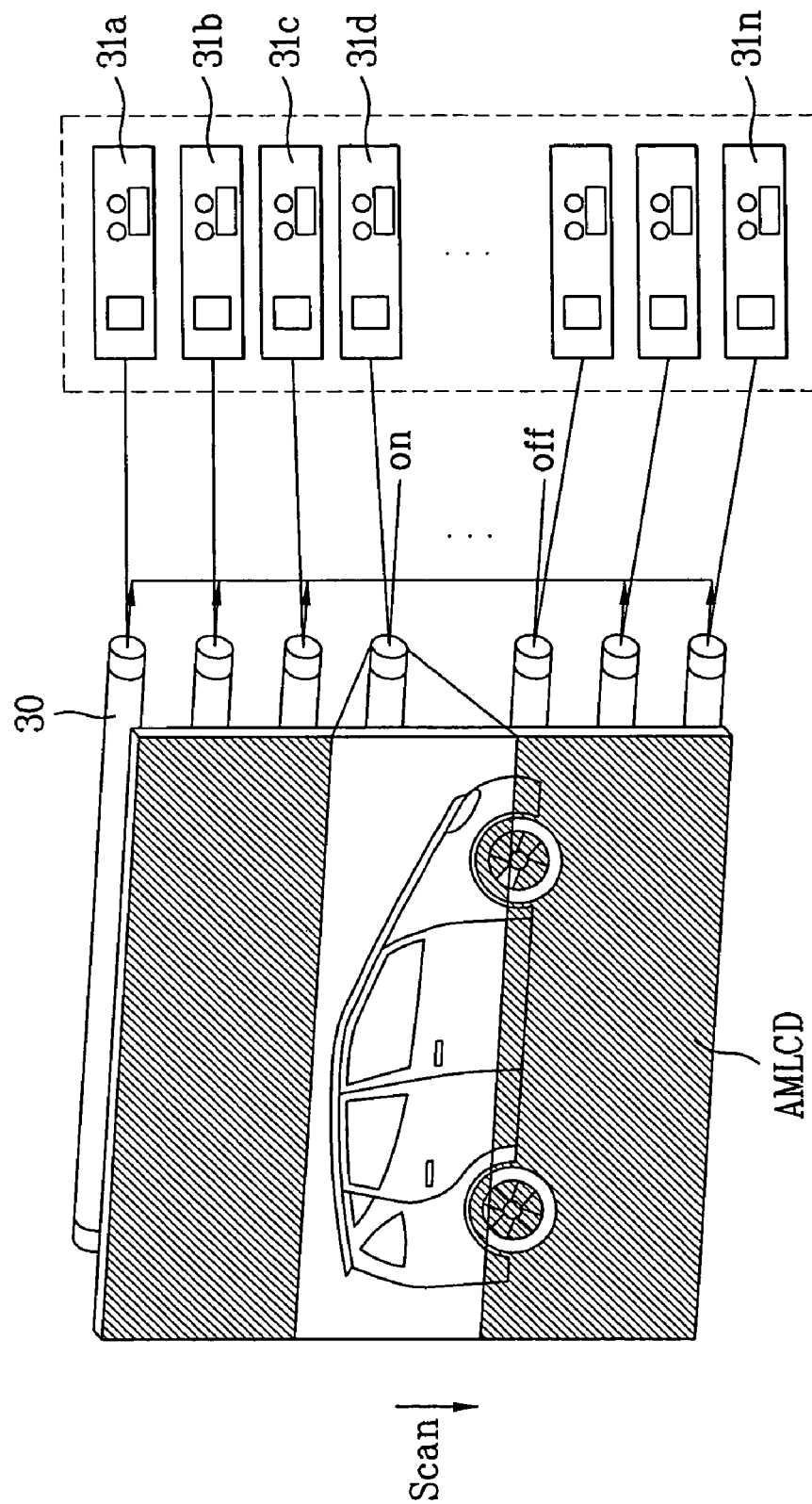
FIG. 3 is a concept view schematically explaining a scanning driving method in a backlight unit having cold cathode fluorescent lamps (CCFLs) according to the related art.
Figure 4:
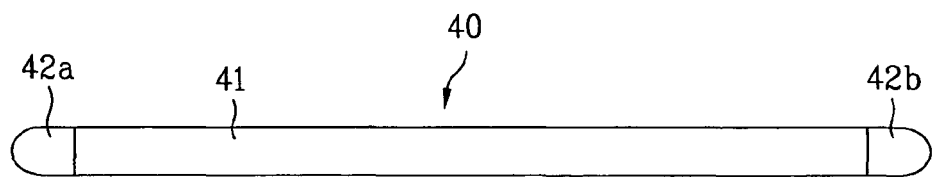
FIG. 4 is a schematic view of a fluorescent lamp employed in a backlight unit of an embodiment of the present invention.

FIG. 4 is a schematic view of an external electrode fluorescent lamp (EEFL) 40 of an embodiment of the present invention. The EEFL 40 includes a cylindrical tube 41, and two external electrodes 42a and 42b that are externally mounted at two ends of the tube 41. Also, a fluorescent substance (not shown) is coated on an inner side of the tube 41.

Figure 5:
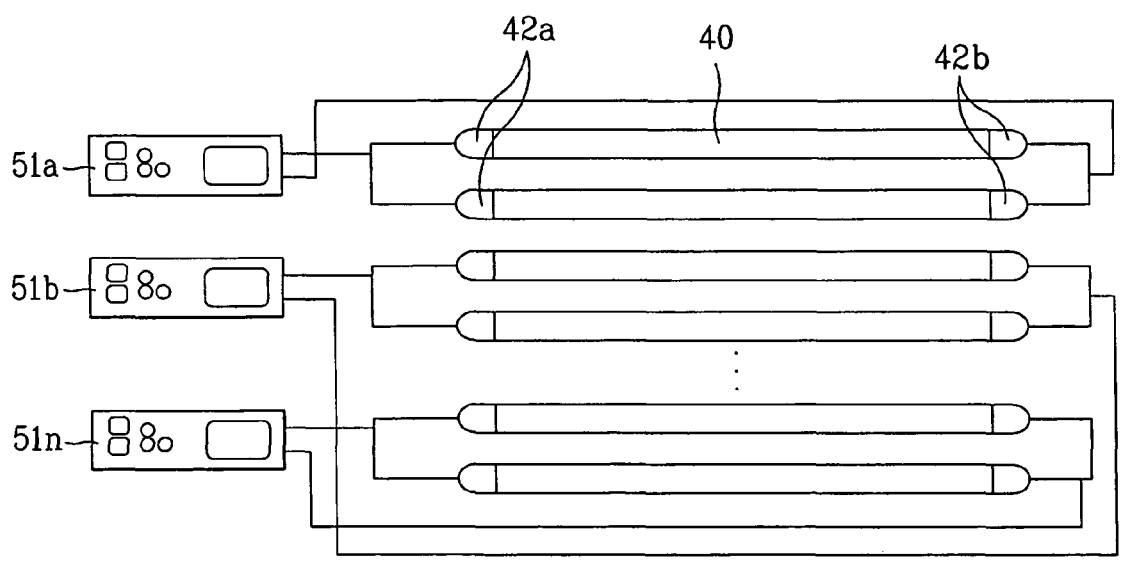
FIG. 5 is a plane view of a backlight unit according to an embodiment of the present invention.

FIG. 5 is a plane view of a backlight unit according to an embodiment of the present invention. As shown in FIG. 5, a plurality of EEFLs 40 are provided in parallel along one direction, wherein the plurality of EEFLs 40 are divided into a plurality of groups, each group having at least the two adjacent EEFLs 40 arranged in parallel. Also, a plurality of inverters 51a, 51b, 51c, ... , and 5 in are provided to correspond to the respective groups of EEFLs 40, such that, in this embodiment, each inverter corresponds to each group of the two EEFLs 40. Also, the electrodes 42a and 42b are provided at the two ends of each EEFL 40, and are electrically connected with the corresponding inverter 51a, 51b, 51c, ..., and 51n. That is, in this embodiment, one of inverters 51a, 51b, 51c, ..., and 51n is electrically connected with every two EEFLs 40.

The backlight unit of FIG. 5 may be suitable for a scanning driving method. That is, for the plurality of EEFLs 40, every two adjacent EEFLs 40 are formed as one group, thereby creating the plurality of groups of the EEFLs 40. In this exemplary arrangement, one inverter is connected with one group of the two adjacent EEFLs 40, so that the plurality of groups of EEFLs 40 are driven individually, thereby realizing the scanning driving method.

Accordingly, every group of two EEFLs 40 requires one inverter, and as a result, the number of inverters can be decreased as compared with the related art backlight unit using CCFLs in which one inverter corresponds to one fluorescent lamp. In the backlight unit of FIG. 5, one group consists of the EEFLs 40. However, the present application is not limited to this, and each group may include more than two fluorescent lamps depending upon the total number of fluorescent lamps and the scanning effect.

In the backlight unit according to the embodiment of present invention, the EEFLs 40 are divided into the plurality of groups that are separately turned on/off by a video signal of the LCD device, thereby enhancing the quality of moving picture.

In addition, as compared with a CRT driven in an impulse method, the LCD device may have a motion blur on displaying a moving picture since the LCD device is driven in a hold method. In order to overcome this problem, the EEFLs 40 of the backlight unit are divided into the plurality of groups. In this arrangement, it is possible to minimize the motion blur to enhance the quality of moving picture by using a scanning method, such that the groups of the fluorescent lamps are separately and sequentially turned on/off, to display virtual data during a predetermined time period of turning on the fluorescent lamps, and not to display virtual data during a predetermined time period of turning off the fluorescent lamps.

Figure 6:
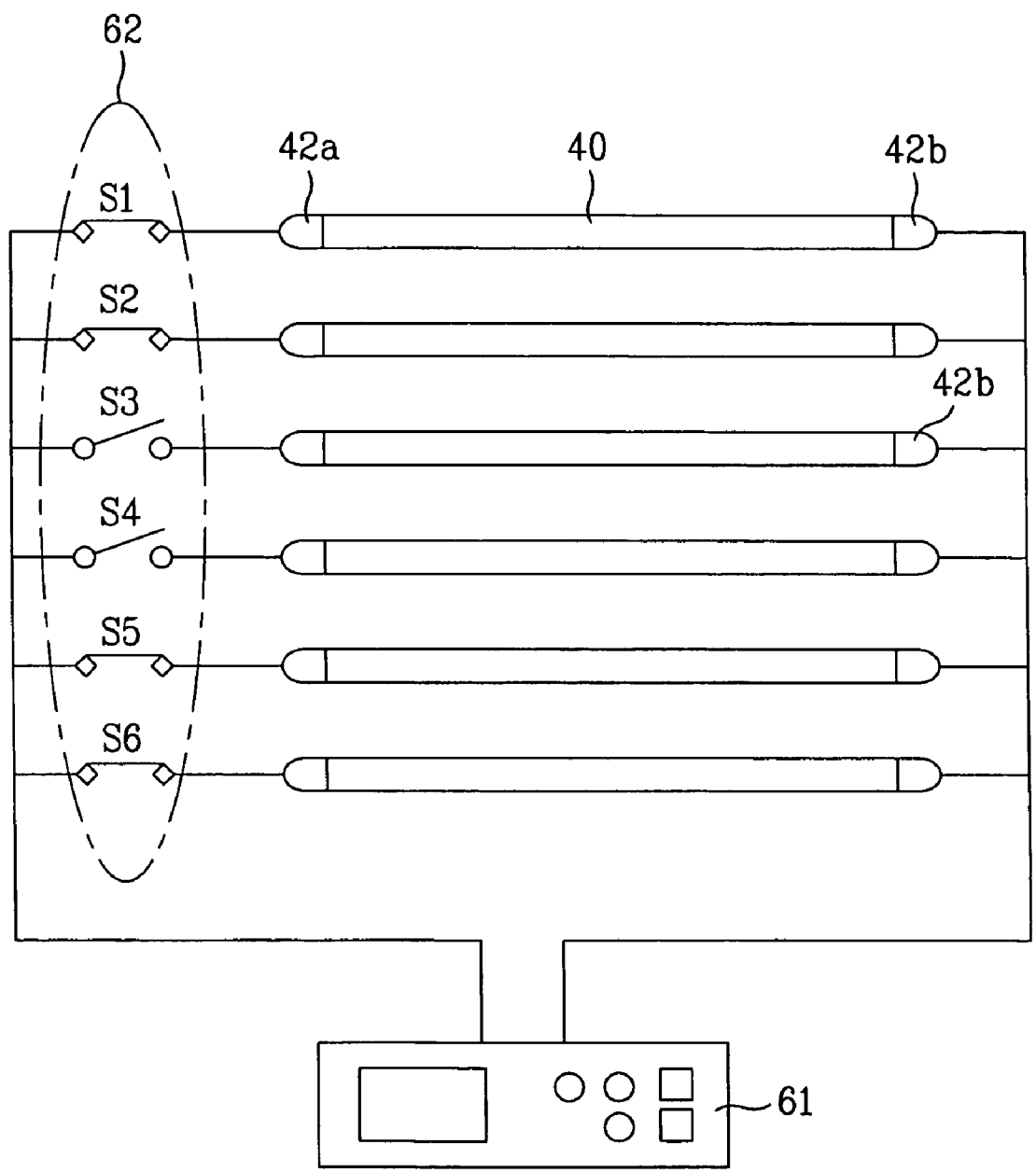
FIG. 6 is a plane view of a backlight unit according to another embodiment of the present invention.

FIG. 6 is a plane view of a backlight unit according to another embodiment of the present invention. As shown in FIG. 6, a plurality of external EEFLs 40 are arranged in parallel along one direction, and the external electrodes 42a and 42b are mounted at two ends of each EEFL 40. Also, the external electrodes 42a and 42b are connected with one inverter 61, and a switching part 62 is provided between the inverter 61 and the external electrodes 42a provided at one end of the EEFL 40. The switching part includes a plurality of switches S1-S6 for turning on/off a power applied to the respective external electrodes 42a of the EEFLs 40. In other words, each of the plurality of switches S1-S6 is arranged in one-to-one correspondence with the external electrode 42a, so that the EEFLs 40 can be turned on/off by controlling the switches S1-S6 according to an LCD video signal, thereby enhancing the quality of moving pictures.

FIG. 6 shows an example of turning off the third and fourth EEFLs 40 by turning off the corresponding third and fourth switches S3 and S4, and turning on the remaining EEFLs 40 by turning on the first, second, fifth and sixth switches S1, S2, S5 and S6, at one point during driving the backlight unit according to this embodiment of the present invention.

The backlight unit of FIG. 6 is suitable for the scanning driving method. That is, the plurality of fluorescent lamps 40 may be divided into the groups, each group including at least one EEFL 40. Thus, the EEFLs 40 are driven by group according to the operation of the switches S1-S6, thereby realizing the scanning driving method.

As mentioned above, the backlight unit and the method for driving the same according to embodiments of the present invention have the following advantages. Unlike the related art backlight unit using the CCFL, in the backlight unit according to the embodiments of the present invention, the number of inverters can be reduced, and therefore the fabrication expenses can be saved.

Further, since the backlight unit of the embodiments has the electrodes provided outside of the EEFL, it is possible to prevent a sputtering phenomenon caused in the electrode of the related art CCFL, thereby increasing the life-span of the lamps of the backlight unit. Also, with the decrease in the number of inverters, the scanning driving method can be realized effectively.

It will be apparent to those skilled in the art that various modifications and variations can be made in the backlight unit for an LCD and the method of driving the backlight of the present invention without departing from the spirit or scope of the inventions. Thus, it is intended that the present invention cover the modifications and variations of this invention provided they come within the scope of the appended claims and their equivalents.

What is claimed is:

1. A backlight unit for a liquid crystal display (LCD) device, comprising:
a plurality of fluorescent lamps connected in parallel along one direction;
a single inverter directly connected to each of the plurality of fluorescent lamps to independently apply a driving voltage to the plurality of fluorescent lamps; and
a switching part disposed between the plurality of fluorescent lamps and the inverter, to apply the driving voltage applied by switching from the inverter to the plurality of fluorescent lamps,
wherein the switching part includes a plurality of switches, each of the plurality of switches is arranged in one-to-one correspondence with each of the plurality of fluorescent lamps and the switching part separately turns on/off the plurality of fluorescent lamps based on input video signals to the LCD device.

2. The backlight unit of claim 1, wherein the plurality of fluorescent lamps are external electrode fluorescent lamps.

3. The backlight unit of claim 2, wherein each of the plurality of the external electrode fluorescent lamps includes two external electrodes.

4. The backlight unit of claim 3, wherein the two external electrodes are mounted at two ends of each of the plurality of fluorescent lamps.

5. The backlight unit of claim 1, wherein the switching part separately turns on/off the plurality of fluorescent lamps to display virtual data during a predetermined time period of turning on the fluorescent lamps, and not to display virtual data during a predetermined time period of turning off the fluorescent lamps.

6. The backlight unit of claim 1, wherein the switching part sequentially turns on one or adjacent some fluorescent lamps of the plurality of fluorescent lamps during an operation of the LCD device.

* * * * *